United States Patent
Beller

[15] 3,675,744
[45] July 11, 1972

[54] SPOT-TYPE DISC BRAKE

[72] Inventor: Hans Albert Beller, Budingerstr, Germany
[73] Assignee: ITT Industries, Inc., New York, N.Y.
[22] Filed: Jan. 21, 1971
[21] Appl. No.: 108,656

[30] Foreign Application Priority Data

Feb. 27, 1970 Germany .................. P 20 09 260.8

[52] U.S. Cl. .................................................. 188/73.6
[51] Int. Cl. .................................................. F16d 55/00
[58] Field of Search .................. 188/73.1, 73.3, 73.6

[56] References Cited

UNITED STATES PATENTS

| | | | |
|---|---|---|---|
| 3,189,129 | 6/1965 | Burnett | 188/73.6 |
| 3,357,524 | 12/1967 | Smith | 188/73.6 |
| 3,416,634 | 12/1968 | Swift | 188/73.3 |
| 3,486,589 | 12/1969 | Hillegass | 188/73.6 |
| 3,561,572 | 2/1971 | Flegl | 188/73.6 |

Primary Examiner—Richard E. Aegerter
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A spot-type disc brake utilizing a floating caliper wherein two brake shoes are applied to opposite faces of the brake disc and an intermediate piece is located between the backing plate of one of the brake shoes and an actuating piston which is maintained in one arm of the floating caliper. The caliper arm is formed with an aperture and the intermediate piece is formed with a projection which cooperates with a depression formed in the brake piston thereby allowing easy removal of the intermediate piece from the disc brake. This in turn allows the easy replacement of the brake shoes which are readily exposed.

6 Claims, 2 Drawing Figures

Inventor
HANS A. BELLER
By Herbert Stern
Attorney

SPOT-TYPE DISC BRAKE

BACKGROUND OF THE INVENTION

This invention relates to a spot-type disc brake and more particularly to such a brake utilizing a floating caliper.

Floating caliper spot-type disc brakes normally utilize a brake carrier straddling the disc of the brake, the carrier being formed with a recess in the central area of the carrier wherein a U-shaped yoke, the floating caliper, is positioned. An actuating appliance, for example a piston, is arranged to displace one of the brake shoes in an axial direction so that it comes into contact with one face of the brake disc and this displaces the caliper in an axial direction, thus bringing the brake shoe which is placed between the other face of the disc and the other arm of the yoke into frictional contact with the brake shoe. Spot-type disc brakes utilizing floating calipers known in the art normally utilize numerous guiding and retaining elements for the floating caliper such as levers, lengthening pieces, coil springs, angle-irons, wedges, split pins and screws. Such arrangements may be found for example in German Patents 1,211,952 and 1,212,366 and French Patent 88,953. The use of numerous guiding and retaining elements results in a brake which is expensive to manufacture and quite complicated, and further, a disc brake in which a complicated procedure is required to remove the floating caliper so that a simple brake pad replacement may be made.

SUMMARY OF THE INVENTION

Therefore, the main object of this invention is to provide a spot-type disc brake having a floating caliper which does not require numerous guiding and retaining elements to maintain the floating caliper in its proper position.

It is a further object of this invention to provide such a brake wherein the floating caliper is easily removed from the brake carrier.

It is a feature of this invention that the force applied to press the brake pads against the disc are evenly distributed over the backing plates of the brake pads.

According to the present invention, there is provided a spot-type disc brake comprising a brake disc having first and second faces, a U-shaped carrier having first and second legs and a first end portion surrounding said disc on three sides, said carrier being formed with a recess between said legs, first and second brake shoes located adjacent said first and second faces of said disc, respectively, a floating U-shaped yoke having first and second arms and a second end portion disposed in said recess and surrounding said disc and brake shoes, actuating means positioned in said first arm for actuating said brake and intermediate means positioned in said first arm between said first brake shoe and said actuating means and responsive to said actuating means for directly applying pressure to said first brake shoe.

Further objects and features of this invention will become more apparent by reference to the following description taken in conjunction with the accompanying drawings, in which:

DESCRIPTION OF THE PREFERRED EMBODIMENT

Figure 1:
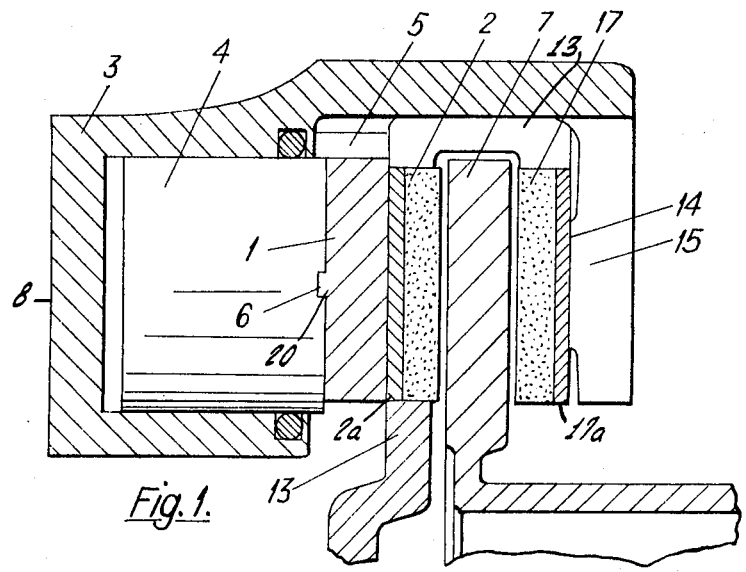
FIG. 1 illustrates a cross-sectional view of a preferred embodiment according to the invention.
Figure 2:
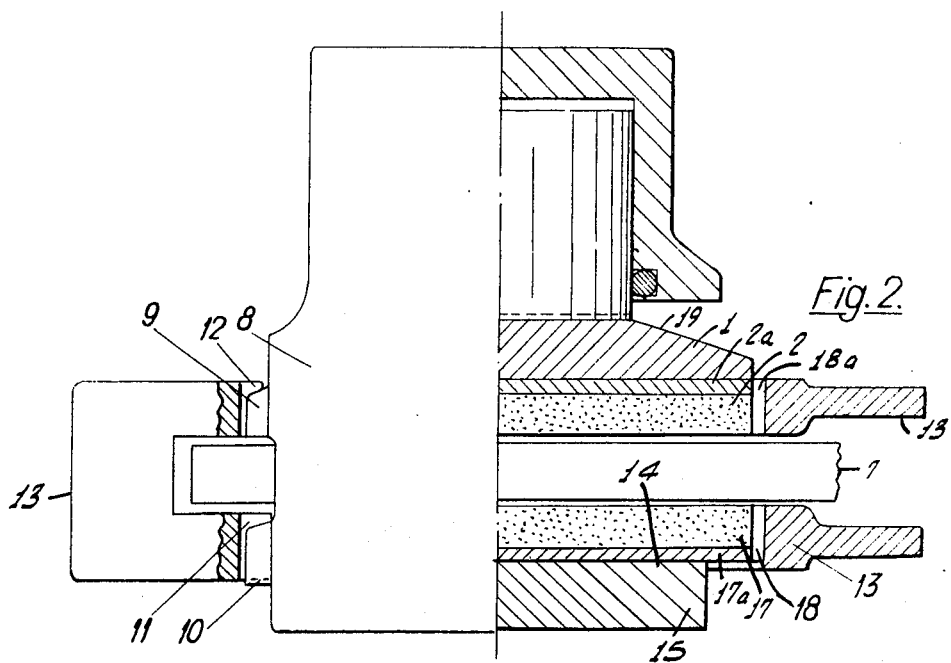
FIG. 2 is a plan view, partially in cross section, of the disc brake according to the invention.

Referring now to FIGS. 1 and 2, there is illustrated a spot-type disc brake which includes a U-shaped brake carrier 13 surrounding a brake disc 7. The brake carrier 13 is disposed to straddle the brake disc 7. Carrier 13 includes therein axial recesses 18 and 18a with respect to disc 7 serving to axially guide and retain the brake pads 2 and 17 and backing plates 2a and 17a to which pads 2 and 17 are secured. A U-shaped yoke 8, the floating caliper, is disposed around a portion of brake disc 7, backing plates 2a and 17a and pads 2 and 17 and is floatingly arranged with respect to carrier 13. The floating caliper 8 is guided and retained in guiding ledges 11 and 12 of brake carrier 13 by means of guiding ledges 9 and 10 of caliper 8 which are each disposed on opposite sides of and adjacent one peripheral portion of disc 7.

Upon actuation of the spot-type disc brake, the brake actuating means 4, in this case illustrated as a piston, which is disposed in arm 3 or yoke 8, urges intermediate piece 1 into pressure contact with backing slate 2a which is in turn urged into forceful contact with brake shoe 2 until the motion of the brake shoe 2 is halted by contact with brake disc 7. In response to this actuation by piston 4, due to the reaction forces present, projection 14 of arm 15 of yoke 8 is forced against backing slate 17a, and, thus, brake shoe 17 is axially forced against the other side of brake disc 7. Thus, it is seen that during the braking operation, both brake pads 2 and 17 bear on the brake disc 7 in an axial direction. Intermediate piece 1 has a trapezoidal transverse cross-section with respect to disc 7 as seen at 19, and a rectangular cross-section when observed in a transverse direction with respect to disc 7, which allows the brake pads to be made as large as possible and which provides for an even transfer of the force of piston 4 to pads 2 and 17. Piece 1 is also formed with a projection 20 which fits into, and cooperates with, a groove 6 which is formed in piston 4.

When it is necessary to replace brake pads 2 and/or 17 due to wear, the floating caliper 8 may be separated from the brake carrier 13 by removing intermediate piece 1 from the brake by urging it in a direction transverse to the brake disc thereby separating projection 18 and groove 6. Intermediate piece 1 is then lifted out through an aperture or opening 5 which is formed in arm 3 of caliper 8. The aforementioned carrier guide ledges 11 and 12 and yoke guide ledges 9 and 10 are so dimensioned that with the intermediate piece, which has a width dimension greater than that of the brake pads, removed, yoke 8 may be moved in the direction of yoke arm 15 disengaging the ledges. The yoke arm 15 can now be removed from brake carrier 13 in a direction radial to the disc.

The advantages achieved by this invention are thus seen to include the fact that the brake carrier need no longer be unscrewed from the axle stub when the brake pads have to be replaced or when the actuating appliance, i.e., the piston, needs repair. Brake torque is transmitted directly to the brake carrier by the brake shoe and therefore the floating caliper can easily be disassembled since it has to receive only those forces of the piston which act in an axial direction. After removing only a single part, the intermediate piece, the floating caliper may be easily removed. Another advantage which will now be apparent is that the shape of the intermediate piece is such that due to its force distributing effect, the brake pads may be made larger than they previously could be made.

While the principles of the invention have been described in connection with specific apparatus, it is to be clearly understood that this description is made only by way of example and not as a limitation to the scope of the invention as set forth in the objects thereof and in the accompanying claims.

I claim:

1. A spot-type disc brake comprising:
    a brake disc having first and second faces;
    a U-shaped carrier having first and second legs parallel to said disc and a first end portion, said first and second legs and said first end portion surrounding said disc on three sides, said carrier being formed with a first recess between said legs to receive said disc, a second recess in said first leg disposed transverse to said disc and a third recess in said second leg disposed transverse to said disc;
    first and second backing plates disposed adjacent said first and second faces of said disc;
    first and second brake shoes secured to said first and second backing plates, respectively, in braking association with said first and second faces of said disc, respectively;
    said first backing plate and said first brake shoe being received in said second recess for movement axially with respect to said disc and said second backing plate and said second brake shoe being received in said third recess for movement axially with respect to said disc;

a floating U-shaped yoke having first and second arms and a second end portion, said yoke being disposed around a portion of said disc, and said back plates and said brake shoes;

actuating means positioned in said first arm for actuating said brake; and intermediate means having a surface parallel to said disc coextensive with said first back plate, said intermediate means being positioned in said first arm between said first backing plate and said actuating means, said intermediate means being responsive to said actuating means for directly applying pressure to said first backing plate and, hence, said first brake shoe.

2. A spot-type disc brake according to claim 1, wherein the first arm is formed with an aperture therein, said aperture being so located as to allow said intermediate means to be removed therefrom in a direction parallel to said disc.

3. A spot-type disc brake according to claim 2, wherein said actuating means is formed with a fourth recess therein; and wherein said intermediate means further comprises a projection thereon, said projection being positioned to engage said fourth recess.

4. A spot-type disc brake according to claim 3, wherein said intermediate means has a dimension in a direction transverse to said disc greater than the corresponding dimension of each of said brake shoes and a trapezoidal cross-section in said transverse direction, the cross-section of said intermediate means looking in said transverse direction being rectangular.

5. A spot type disc brake according to claim 4, wherein said yoke is formed with a first pair of guide ledges; and wherein said carrier is formed with a second pair of guide ledges, said yoke ledges being retained by said carrier ledges.

6. A spot-type disc brake according to claim 5, wherein the dimension of said first and second pairs of ledges in a transverse direction with respect to said disc is such that they may be separated by displacing said yoke a distance corresponding to the transverse dimension of said intermediate means.

* * * * *